United States Patent [19]

Gamblin

[11] Patent Number: 5,593,459
[45] Date of Patent: Jan. 14, 1997

[54] SURFACTANT ENHANCED DYEING

[76] Inventor: Rodger L. Gamblin, 8 Springhouse Road, Dayton, Ohio 45409

[21] Appl. No.: 327,631

[22] Filed: Oct. 24, 1994

[51] Int. Cl.$^6$ .................................................. D06P 1/62
[52] U.S. Cl. .................... 8/539; 8/576; 8/587; 8/589; 8/594; 8/917; 8/921; 8/922; 8/912; 8/908; 106/22 R
[58] Field of Search ............................... 8/539, 907–912, 8/654, 576, 587, 589, 594, 917, 921, 922; 106/20 D, 22 R

[56] References Cited

U.S. PATENT DOCUMENTS

| | | | |
|---|---|---|---|
| 1,534,019 | 4/1925 | Baddiley et al. | 8/912 |
| 1,616,103 | 2/1927 | Baddiley et al. | 8/912 |
| 3,188,163 | 3/1965 | Dehn, Jr. et al. | 8/908 |
| 3,188,164 | 6/1965 | Dehn, Jr. et al. | 8/908 |
| 3,706,524 | 12/1972 | Flensberg | 8/911 |
| 4,252,534 | 2/1981 | Abel et al. | 8/617 |
| 4,849,770 | 7/1989 | Koike et al. | 346/1.1 |

*Primary Examiner*—Margaret Einsmann

[57] ABSTRACT

Cationic dyes and protonated disperse and solvent dyes are solubilized by an excess (over molar equivalence) of an anionic surfactant to form dye baths and inks for paper. These materials are suitable for the dyeing and printing of cationic dye receptive materials inclusive of silk, wool, nylon, triacetate, vinyl, and cationic dye receptive acrylic, polyester, and polyolefins with water-fast cationic and disperse or solvent dyes. Baths of the solubilized solvent and disperse dyes may be partially neutralized and are suitable for dyeing polyester and other hydrophobic fibers thus eliminating the need for forming dispersions with disperse dyes.

12 Claims, No Drawings

SURFACTANT ENHANCED DYEING

BACKGROUND OF THE INVENTION

Presently cationic dyes are used primarily for the dyeing of polyacylonitrile (hereafter, acrylic) fabrics. Some polyester and polyamides that have been modified to carry acidic groups at the molecular level, usually sulfonic acid groups, are also dyed with cationic dyes. Generally cationic dyes are of outstanding brightness of color and many modern cationic dyes have good fastness properties.

Extensive literature is to be found that describes cationic dyes and their application. *The Color Index*, a joint publication of The American Association of Textile Colorists and Chemists, of Research Triangle Park, N.C., and The Society of Dyers and Colorists of Yorkshire, England, lists current and past cationic dyes and describes their application. *The Color Index* uses the term, basic dye, which is an older name for cationic dyes.

*The Color Index* also gives names of dyes by application class; which names are used world wide. Below we shall use the names assigned by *The Color Index* where applicable, thus a name, such as Disperse Red 1, denotes a particular dye listed in *The Color Index* under disperse dyes. *The Color Index* gives application information regarding the dye in the appropriate section and may give the chemical formula of the dye, if such information is available, in a separate section.

Perhaps less well known is that there are many dyes, for example, many disperse or solvent dyes, that are not normally cationic, but that become positively charged and thus cationic in an acidic solution. For purposes of this invention, we shall include such dyes in our definition of cationic dyes, provided they are in a solution that causes a significant portion of their molecules to carry a positive charge.

There are a number of fibers from animal origins that include silk, wool, alpaca, leather, and so forth that may readily be dyed with cationic dyes. Presently such dyeings are not fast to washing so that fixing agents, such as tannic acid (or various synthetic materials with comparable properties) followed by metal salts, such as tarter emetic, are used. Such dyeings lack light fastness, and, with current fears of chemicals in general, lack environmental acceptance.

Some fibers are produced from plastics that are polymerized with some portion of monomers that carry sulfonic acid groups as part of their molecular structure. Such fibers are readily dyeable with cationic dyes. Polyester, polyamides, polyacrylonitrile, polyethylene, and polypropylene all have been made, at least in laboratory quantities, to incorporate such groups. DuPont Company of Wilmington, Del., for example, has a series of polyester products that contain such acidic groups. These materials are all dyeable using cationic dyes.

With the exception of cellulose based materials such as cotton, linen, or ramie, fibers that are not cationically dyeable are usually hydrophobic and dyed with disperse dyes. Polyester, polyolefins, and some acrylics are such fibers.

Cellulose based fibers, generally speaking, have only a weak affinity for cationic dyes. As is described below, cellulose materials may be treated with various agents that increase the affinity of the fiber for cationic dyes.

BRIEF SUMMARY OF THE INVENTION

This invention relates to the incorporation of a sufficiency of an anionic surfactant in an aqueous dye bath to cause solubilization of a cationic dye in the dye bath. It is implied by this statement that the pH of the bath, as it is being formed, is made to be in a range that causes the dye to be positively charged and thus cationic.

It is to be noted that, though the term, "cationic dye", is used, included also in the class of dyes addressed by this invention are dyes that become protonated and thus cationic in an acidic, aqueous bath in the presence of an excess of anionic surfactant. Such dyes may be classed presently by *The Color Index* as disperse or solvent dyes, but, because they carry a positive charge in the dye bath, are here classed as "cationic dyes".

Since, normally, an anionic surfactant will cause the precipitation of a cationic dye in an aqueous bath, a "sufficiency of an anionic surfactant in an aqueous bath to cause solubilization" implies a considerable molar excess of surfactant over the molar quantity of dye. It is not surprising that, in almost all cases, an equimolar amount of a anionic surfactant may be added to a water-soluble cationic dye, dye bath and a cloudy precipitate will result. It is very surprising, however, that the addition of more surfactant will cause the bath to clear so that a true solution or, at the very least, a micro-dispersion is achieved.

Many cationic dyes are not very soluble in water. Rhodamine B and Victoria Blue, for example, soon precipitate from an aqueous bath, at room temperature, containing less than a percent dye. As is discussed in more detail below, such dyes are readily and permanently solubilized by the procedures of this invention. Other cationic dyes, examples being Solvent Black 5 (Nigrosine), Solvent Blue 23 (a phenolated pararosaniline), and Induline (a dark blue azine dye) are normally water insoluble, but are solubilized sufficiently by the teachings of this invention to intensely dye many cationic dye receptive materials.

The surfactant in the dye bath aids the dyeing of receptive fabrics by dissolving in the fiber, or by aiding the dye to dissolve in the fiber, or both. Ordinary polyamide, for example, nylon 6,6, which normally is not dyeable with cationic dyes, can be rapidly and readily dyed by a hot dye bath containing a molar excess of surfactant and cationic dye. Furthermore the dyeing is generally fast against washing as if the fiber had originally been made with anionic monomers in its original polymerization.

Surprisingly this same dye bath will dye cellulose triacetate, though not so readily as nylon. Vinyl chloride based fabrics may also be dyed with such baths as may urethanes, epoxies, and cellulose acetates.

The dyeings of such fibers directly with cationic dyes broadens considerably the utility of such dyes. The fact that these fibers absorb surfactant from the dye bath can be confirmed by first treating the fibers in an aqueous bath containing only the acidic surfactant, then dyeing them in a bath containing only a cationic dye. The dyeing of materials so treated is greatly enhanced.

A dye bath, in accord with the teachings of this invention, can be used to dye human hair, silk, wool, leather, and other such proteinaceous materials with dyes that normally would be considered to be disperse dyes.

For example, Disperse Red 1 is a scarlet when applied as a disperse dye to polyester. This dye may be solubilized by a twice molar excess of dodecylbenzenesulfonic acid in an warm aqueous bath wherein the shade changes to a bright magenta. This bath may, in turn, be used to rapidly and intensely dye silk, leather, or wool a bright bluish red that reverts to a wash fast scarlet when rinsed in cold water.

Surprisingly, in many cases, once such a disperse or solvent dye is solubilized, the bath may have its pH adjusted toward neutral, and though the shade may alter, indicating some loss of protonation of the dye, the dye remains in solution. Silk, leather, wool, human hair, fur and other such materials still dye from such baths. This feature of the baths is useful since it may be desirable not to expose some materials being dyed to highly acidic dye baths; in particular, human hair and skin.

Normal cationic dyes from baths in accord with the teachings of this invention may also be used to dye hair, fur, silk, leather, and wool. In this case the surfactant serves to solubilize the dye in the dye bath, to dissolve in or aid the dye to dissolve in the fiber so as to increase the receptivity of the fiber for the dye, and to fix the dye on the fiber.

Such dyeings are wash fast to the type of treatments usually afforded hair, fur, silk, leather, and wool in washing, laundry, and dry cleaning. This fastness is not usually achieved by normal cationic dyeings of these materials, that is, dyeings achieved with a hot solution of the dye in water. Generally cationic dyeings from baths, in accord with the teachings of this invention, have surprisingly good lightfastness. The reasons for an enhancement of this property are not understood.

Polyester, polyolefins, and acrylics that are not generally receptive to dyeing with cationic dyes may still benefit from the teachings of this invention. As noted above, if a disperse dye is dissolved with the aid of an excess of surfactant in a protonating, acid dye bath, after dissolution, in most cases, the bath pH may be adjusted toward neutral without precipitating the dye. Dyes from such baths can dye a hydrophobic fiber such as polyester rapidly and cleanly. In essence the dye, by being solubilized according to the teachings of this invention, may be maintained in solution even if the dye is, at least partially, no longer protonated. In this form, the dye is active as a disperse dye for dyeing hydrophobic fibers.

What is gained in the dyeing of hydrophobic fibers is the elimination of the need to carefully grind the disperse dye to a uniform particle size for reproducible results. Faster and easier dyeing is also achieved since the dye is in a molecularly dispersed form. Materials dyed with this procedure are generally brighter than conventional disperse dyeings. Since the brightness of dyeings achieved by these procedures is not greatly enhanced by soaping and scrubbing the material after dyeing, it is suspected that the enhanced brightness arises because of the elimination of particulate dye from the surface of the material, which, with conventional disperse dyeing, is unavoidable.

Synthetic fibers dyeable with cationic dyes, such as cationic dyeable polyester and acrylic tend to have closed, tight molecular structures. When such fibers are dyed with certain protonated solvent or disperse dyes, the shade achieved is of the protonated dye. Such a dyeing will not regain the color of the non protonated dye except under unusual circumstances, such as being soaked for an extended period in a warm ammonia (or other low molecular weight amine) solution.

Washing the material in an alkaline bath, such as might be found in a home laundry, does not return the shade of the dyeing to its non protonated form. As will be discussed below, such dyeings permit the achievement of brilliant colorings inexpensively, since the protonated form of many simple solvent dyes yield brilliant colors in shades from yellow through cyan.

Cotton is generally not very receptive to dyeing with cationic dyes. The teachings of this invention can, therefore, usually only be used to dye ordinary cotton in light shades that are not particularly wash fast. As is discussed in more detail below, however, cotton may be treated with various agents so as to be made receptive to cationic dyes. Though such materials tend to have relatively poor wash fastness with ordinary cationic dyes, they can have reasonable wash fastness with water insoluble cationic, disperse or solvent dyes applied according to the teachings of this invention.

When an aqueous system, containing an excess of surfactant so as to solubilize a cationic dye, is applied to paper as might be the case with, for example, a water based ink, the dye will not readily wash off. The surfactant in solution may be neutralized with ammonia, or other base, so that the ink may be at a neutral or even basic pH, if the cationic dye is stable under such circumstances. The standard of fastness of dyeings achieved with the teachings of this invention on paper meets requirements for most applications.

Though paper is composed mostly of cellulose, and though dyeings produced on cellulose with the cationic dyeings of this invention generally would not meet the requirements for textiles, they do meet requirements for paper printing. Because of this fact, we shall consider paper products and paper fibers to be cationic dye dyeable.

Presently silk, wool, leather, and many polyamides are dyed using acid dyes. Generally such dyes have similar structures chemically to solvent and disperse dyes, but also have sulfonic acid groups incorporated within their molecules, to render the dye soluble in water. This solubility carries over into dyeings made with this class of dye so that, for example, a dyeing made with Acid Orange 7, which is highly soluble in water, tends to have poor to fair wash fastness (a rating of 1–2 in *The Color Index*) on wool.

With this invention, Solvent Yellow 14, which is Acid Orange 7 without a sulfonic acid group, and which is about the same shade, may be applied directly to wool or silk. The wash fastness is more than satisfactory (estimated to be 3–4). Somewhat surprisingly, the dyeing with Solvent Yellow 14 is also fast against dry cleaning, even though the dye itself is readily soluble in most dry cleaning fluids. This property is thought to arise from an affinity of the dye for the fabric, or from the lack of penetration of the dry cleaning fluid into the fiber, or both. The dyeing also does not sublime from wool, silk, or nylon in spite of Solvent Yellow 14's tendency in this regard. It is felt that the affinity between the dye and fiber, in this case, holds the dye in place.

Finally, a problem with any dye bath is how to dispose of any surplus or depleted materials used for the dyeing. With the dye baths of this invention, the surfactants used may be precipitated by harmless flocculating agents such as sodium aluminate. The dyes in the bath under such conditions almost always precipitate with the surfactant so that a means exists for easy removal of dye from spent baths. The precipitate, after removal from the waste stream by simple filtration, may readily be disposed of as solid waste.

In summary, this invention contemplates the solubilization of a cationic charged dye with an excess of an anionic surfactant to achieve a dye bath for the dyeing of cationic dye receptive fibers, hydrophobic fibers, paper or leather with wash fast cationic, or wash fast, protonatable disperse or solvent dyes. Such dye baths may also be used as water based inks for certain printing applications and as dyes for hair coloring.

DETAILED DESCRIPTION OF THE INVENTION

This invention considers the use of a dye bath that comprises water, a protonatable or protonated dye, and sufficient anionic surfactant to solubilize the dye. During formation of the dye bath, the pH of the dye bath is selected to be in the range where the dye molecules naturally carry a positive charge. Usually the pH is most readily adjusted by using a mineral acid, preferable sulfuric, or an inexpensive base such as ammonium or sodium hydroxide.

Some dyes, for example, phenylazoaniline, are protonated only in an acid solution. Such a dye, therefore, is not normally considered to be a cationic dye, but instead is a solvent dye (Solvent Yellow 1). It is, however, more than 99% protonated in a dye bath at a pH of 2, and, in that bath, is a cationic dye. Malachite Green loses its protonation at a pH of about 7–8. It is, however, normally considered to be a cationic dye. Basic Red 12 is a cyanine dye that remains protonated at a pH level of at least 9.

The point is, whether a dye is cationic or not is determined relative to its environment. For purposes of this invention, a dye molecule shall be considered to be cationic if it is positively charged in the dye bath. When the pH of the bath is at the pK value of the dye for protonation, then, in accord with well known rules of chemistry, the dye will be about 50% protonated.

Generally speaking adjustment of an acid pH toward neutral tends to make protonatable disperse or solvent dyes less soluble in the dye bath. The rate of dyeing of cationic dye receptive materials, such as silk, wool and so forth declines whereas the rate of dyeing of hydrophobic fibers such as polyester generally increases. It is believed that the hot (generally boiling) dye baths, over a reasonable pH range, have enough of both ionized and non ionized dye to permit of dyeing by both cationic receptive and disperse dye receptive fibers with protonatable disperse or solvent dyes.

In a practical dye bath, the actual percentages of dye, surfactant, mineral acid, if any, and water vary widely depending upon the type dye being used, its tinctorial strength, the shade being sought, the material being dyed, and the type of equipment being used for the process. In the case of a light shade in a bath with a long liquor ratio, the actual dye in the bath may be only a few tens of parts per million or less. On the other hand, with a flexographic printing ink in a dark shade as much as ten percent dye might be required in the bath.

The surfactant serves a number of purposes besides solubilizing the dye. It promotes penetration of the dye bath into the fabric or paper and, in addition, aids the dye in being soluble in the fiber. If the surfactant itself dissolves in the fiber, it aids in the fiber becoming positively charged so as to attract the cationic dye.

A simple one-to-one salt of the cationic dye and anionic surfactant is generally insoluble in water so the surfactant also acts to increase the wash fastness of cationic dyes in the fiber. The surfactant may also be used to thicken the dye bath. Common surfactants at a few percent concentration, especially in the presence of a salt, act to increase the viscosity of water.

The surfactant may also permit the solubilization in water of cationic dyes that have little or no solubility in water. Such dyes become useful with aqueous baths and yield especially wash fast dyeings.

As discussed above, many disperse or solvent dyes become cationically charged in an a strongly acid solution. If the source of acidity is a mineral acid such as sulfuric, hydrochloric, phosphoric, or nitric, in the absence of a surfactant, it is generally found that the charged dye is sparing soluble in an aqueous bath. The dye is usually so insoluble, in fact, as to render a bath of the dye and mineral acid useless for the purpose of dyeing. If an anionic surfactant, that is also a strong acid in solution, is in the bath, however, even in the presence of a mineral acid, the protonated disperse dye is usually soluble provided the surfactant is present in excess, on a mole per mole basis, over the dye.

The inclusion of more surfactant usually increases the amount of dye that is soluble in the bath at any pH, however, more surfactant generally slows the rate of dyeing. This suggests that the surfactant may be used as a leveling agent. It has been found that, indeed, such is the case. Highest dyeing rates are found near the concentration of surfactant where the dye becomes insoluble. Because many materials to be dyed absorb the surfactant, baths operating near the border of solubility often need to have the surfactant level adjusted (to maintain the dye in solution) as goods to be dyed are added to the bath.

Many anionic surfactants are useful with this invention. The most effective appear to be materials wherein the acidic group in the molecule resides at the end of the molecule. For example, dodecylbenzene sulfonic acid (DBSA) is very useful, whereas, dioctyl sulfosuccinate is less so. The latter takes at least three or more times the amount by weight of material to produce the same effect.

DBSA is presently widely used as a surfactant. It is, of course, desirable to use such materials, if possible, since their widespread use for other purposes generally assures both low cost and environmental acceptance. Dodecyl sulfate (DS) is another such a material and very useful for purposes of this invention. DS is generally not chemically as stable as DBSA in acid solution, but seems to be adequate in a practical sense. Laureth sulfate (LS) is also useful for purposes of this invention and has better stability than DS.

A wide range of other surfactants such as alpha-sulfo fatty acids or fatty esters may be used as may sulfated monoglycerides. Sulfonated alpha olefins are also useful. Lignin sulfonates may also be used and are very low cost, but, since lignins may be strongly colored, can, in themselves, stain the materials being dyed usually with a light brown bachground color.

Soaps, that is the alkali metal salts of fatty carboxylic acids, may also be used and are highly effective over the appropriate pH range. Generally permitted pH values for solutions involving soap is higher than about 8.5 so that cationic dyes stable at this pH must be used with such surfactants. Malachite Green cannot be used at such a pH, since it will decolorize, whereas Basic Red 12 is useful. Soaps are especially useful for applications involving cationic dyes for inks and cosmetics. They are effective, very inexpensive, readily available, and environmentally acceptable.

In practice, a means of formulating a dye bath that incorporates an ordinary water soluble cationic dye is to dissolve the dye in the bath, then add surfactant while stirring. Initially the bath becomes cloudy, but becomes clear as more surfactant is added. This is the practical and operative meaning of the phrase, "sufficient anionic surfactant to solubilize the dye". This phrase should, of course, be considered in the context of the actual use conditions of the dye bath, including the temperature, pH, and concentration. If very little surfactant is used over that necessary to solubilize the dye, it may be found that more must be added to the bath during the dyeing of the fabric to maintain clarity. The fact that more must be added is taken as evidence that the goods being dyed absorb surfactant from the bath.

In the case of soaps as surfactants used with basic dye solutions, the dye solution must have its pH adjusted to 8.5 or higher before adding soap solution. If this procedure is not followed the soap will precipitate, usually in hard to redissolve curds. Many basic dyes decolorize at such high pH values.

In the case of water insoluble basic dyes, the dye and surfactant may be added to an inexpensive water miscible solvent, such as methanol, until dissolution is achieved. This mix may require adjustment of pH, but then may be diluted with water. Proper mixtures may be diluted as desired with no tendency to precipitate. If such a procedure is not followed, the dye tends to lump up in the bath and be slow in dissolving in the surfactant, water solution.

It is not always possible to dissolve large quantities of water insoluble cationic dyes, even using a surfactant; still, if the dye is mostly in a fine dispersion, but partially in solution, transfer will take place from the bath to a cationic dye receptive fiber rapidly and effectively. In such a case, the preferred means of formulating the dye bath is to first prepare a dispersion of the dye using the types of dispersing agents normally used with disperse dyes. Such materials include lignin sulfonates and condensation polymers of formaldehyde with naphthalene sulfonic acid. Such materials are well known and commercially available. The dispersion of the dye is usually made by grinding the dye and dispersant in water in machines sold for the purpose. Shot, vibration, or Cyclomills are useful for this purpose.

A dye so prepared may first be dispersed in the dye bath, the surfactant added, and the pH adjusted to be in the appropriate range for the dye. The dye at least partially dissolves in the bath and thus is available for transfer to the goods to be dyed. This procedure is similar to the application procedure normally followed with disperse dyes. The difference is that here the dye is not a disperse dye, but instead a water insoluble cationic dye such as Nigrosine. The degree of water solubility necessary for transfer is achieved by means of the surfactant, suitable pH, and temperature.

In the case of disperse or solvent dyes, dissolution may conveniently achieved used a water miscible solvent and surfactant at a suitable pH, however, many disperse dyes are available as easily dispersible powders. A dispersion is first prepared as if one were preparing a disperse dye bath; then, however, surfactant and acid, to adjust pH, are added. In this case, as opposed to water insoluble basic dyes, the dye usually dissolves completely. An especially convenient method of adding surfactant is to use DBSA directly. This material both protonates the dye and dissolves it at the same time. DBSA is readily available from various manufactures and is most preferred for general application.

Dyes that may be used with this invention include almost all water soluble cationic or basic dyes current used in commerce. In addition, because the surfactant system may solubilize dyes that normally are not soluble in water, certain dyes that normally are water insoluble, but that are cationic, may be used from an aqueous bath. An example is Solvent Blue 23, which is triphenylated pararosaniline. This dye is normally completely water insoluble. With suitable surfactants from a hot aqueous dye bath, however, Solvent Blue 23 may be used to dye polyamide beautiful, true-blue shades from an aqueous bath. Solvent Black 7, Nigrosine Base, may be also be used to dye silk, wool, and nylon in rich blue-black shades, though the dye normally is quite water insoluble.

A review of available cationic dyes may be found in Ullmann's *Encyclopedia of Industrial Chemistry, Fifth Edition* (VCH Publishers, New York, N.Y.). Unfortunately the information regarding cationic dyes is under the various listings for different chemical classes of dyes. The most relevant sections are those relating to azine, azo, methine, and triarylmethane dyes. The dyes discussed as cationic dyes in these sections are useful for purposes of this invention.

In addition to normal cationic dyes, however, the much broader classes of solvent and disperse dyes may also be useful. Not all such dyes or pigments are protonatable in an aqueous solution using the teachings of this invention, however. Below we shall describe in some detail some of the dyes that may be used with the teachings of this invention. In addition we shall attempt to give some guidelines as to the types of dye or pigment that do not appear to be useful.

The most complete listing of dyes, both present and historical, is found in *The Color Index* referenced above. The application class listed under "basic dyes" references most all dyes of commercial interest, and many that are of historical interest only. Most such dyes can be used as cationic dyes for purposes of this invention. In addition most of the dyes listed under disperse or solvent dyes are useful if their structure is such that they may be protonated in aqueous solution.

There is a broad class of disperse dye that is based upon the azo coupling of an aromatic amine with the ring of a second aromatic amine. Formula 1 shows the general structure of such dyes.

Prototypical Azo Disperse Dye

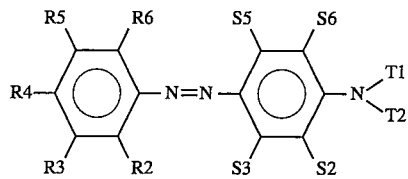

Formula 1

Generally R2, R4, and R6 may be hydrogen or strongly electron withdrawing groups such as nitro, cyano, chloro, or bromo. Such groups are bathochromic and increase the tinctorial strength of the dye. R3 and R5, which do not conjugate with the azo chromophore, are usually hydrogen. S3 and S6, are usually hydrogen or an electron donor such as a methoxy or acetamide. These latter groups exert a bathochromic effect on the molecule. S3 and S5 are usually hydrogen. T1 and T2 are generally hydrogen or aliphatic, but may be aromatic. Substituted aliphatic groups such as 2-hydroxyethyl or cyanoethyl are popular. Aliphatic or aromatic groups, as opposed to hydrogen, on T1 and T2 are generally bathochromic. 2-substitution of a aliphatic T1 or T2 group is hypsochromic, if the substituent is electron withdrawing.

Such dyes may be used for purposes of this invention and color a range of bright yellows and reds to rather dull blues. The azo group is easily protonated in a strongly acidic surfactant solution and as a result such dyes may be used to dye silk, wool, nylon, acetate, triacetate, and vinyl fabrics directly. They also may be used for the permanent dyeing of paper and hair, as well as cationically receptive synthetic fibers in general. Cotton that has been treated to be receptive to basic dyes is also readily dyed by these baths.

Some disperse dyes, of the type discussed in connection with formula 1, are not stable when applied using the teachings of this invention. In particular when R2, R4, and R6 are respectively nitro or cyano, nitro, and halogen, the dye so formed is not stable in the hot acidic solutions used with this invention. The halogen apparently hydrolyzes so as to change the color of the dye. Such dyes are not useful for purposes of this invention, at least in their non hydrolyzed form, due to the variation of shade produced from the bath through time.

Formula 2 shows the structure of an anthraquinone dye. For a disperse dye U1, U4, U5, and U8 are generally hydroxyl, amino, substituted amino, or nitro groups. V2, V3, V6, and V7 are generally halogen, alkoxy, phenoxy, or substituted phenoxy. Sometimes V2 and V3 taken together may be a heterocycle. Generally speaking the anthraquinones are bright orange through blue shades of good lightfastness. As will be seen in the examples below, the anthraquinones are useful dyes for the purposes of this invention.

The anthraquinone dyes, as a class, involve the generation of considerable waste in their manufacture. As the proper disposal of this waste has increased in cost, so has the price of anthraquinone dyes. Since the anthraquinones are usually red through blue-green dyes, substitutes have been developed for these shades.

There are a series of modern dyes based upon the diazo coupling of various heterocyclic diazo bases to the usual coupling agents. Such dyes, because of the longer conjugation length of the heterocyclic base, yield attractive, blue through blue-green shades when used to make either cationic of disperse dyes. With cationic dyes, the heterocycle nitrogen is quarternized, while, in the case of disperse dyes, electron withdrawing groups are included on the heterocycle, but the nitrogen is uncharged. Both such dyes are useful for purposes of this invention.

Protypical Anthraquinone Disperse Dye

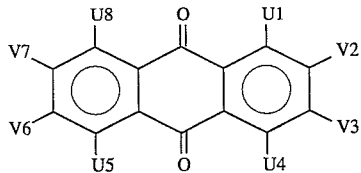

Formula 2

Dyes that are not useful for purposes of this invention include materials not stable in protonated form such as the particular azo dyes discussed above, or dyes not soluble in the baths contemplated by this invention. For example, there are a number of dyes or pigments based upon the coupling of anilines, substituted with strongly electron withdrawing groups, to β-naphthol or β-naphthol derivatives. Under such circumstances the azo nitrogen is not protonatable by the acid strengths achieved in the baths of this invention. An example is Solvent Red 23, a scarlet that is made by coupling phenylazo aniline to β-naphthol. The phenylazo group is strongly electron withdrawing so that the dye is not sufficiently soluble in the baths considered in this invention so as to permit acceptable shades in reasonable times.

Couplings to β-naphthol, or its derivatives, to more basic aromatic amines, however, such as, for example, Solvent Yellow 14, described above, or the dye produced by coupling N-Phenyl-p-phenylenediamine to naphthol-AS are both useful for purposes of this invention. Surprisingly Para Red, a pigment, may also be used as a dye according to the teachings of this invention, however, Pigment Orange 5 is not useful. Apparently the extra ortho nitro group on the azo base is sufficient to make the azo group too acidic to protonate.

Perhaps not surprisingly, most nitro dyes (see, for example, the section of Volume 4 of *The Color Index, Third Edition* describing nitro dyes) are useful for purposes of this invention. Simple nitro dyes, with their very low molecular weights, give very rapid, beautiful, wash fast bright yellow or orange dyeings on wool or silk, for example. It would be expected that such dyeings would not; be particularly light fast.

Azo couplings between aniline and phenol, or substituted phenol, are also useful as are couplings to active hydrogen compounds such as acetoactanilide and 3-methyl-1-phenyl-2-pyrazolin-5-one. Here, as with the case with naphthols, too many powerful electron withdrawing substituents on the coupling agent tend to render the dye too insoluble for purposes of this invention. In the case of acetoacetanilide, electron withdrawing substituents also tend to hinder absorption in the visible, when the material is used as a dye.

Quinoline dyes, in particular, Disperse Yellow 54, are also highly useful and readily solubilize in a bath of water and a molar excess of acidic surfactant.

As mentioned above most popular cationic dyes currently being used are useful for purposes of this invention. In particular Basic Yellows 2, 11, 13, 21, 28, 29, 37, 40 and 51; Basic Oranges 1, 2, and 21, Basic Reds 1, 12, 14, 15, 16, 18, 46, and 49; Basic Violets 1, 2, 3, 4, 10, 14, and 16; and Basic Blues 1, 3, 7, 9, 26, 41, and 54 are especially useful.

Especially useful disperse dyes include Disperse Yellows 3, 5, 7, 23, 42, 54, 64, 82, 163, and 211; Disperse Oranges 1, 3, 25, 29, 30, 37, and 44; Disperse Reds 1, 4, 5, 11, 13, 15, 17, 50, 54, 60, 65, 73, 82, 86, 91, 92, 135, 153, 167, 167:1, 177, and 179; Disperse Violets 1, 26, 28, and 33; Disperse Blues 3, 7, 35, 56, 60, 73, 79, 87, 102, 106, and 291; and Disperse Black 9.

Especially useful Solvent Dyes include Solvent Yellows 2, 3, 13, 14, 33, and 56, Solvent Oranges 2, 7, 20, and 60; Solvent Reds 1, 52, and 111; Solvent Violet 14; Solvent Blues 23, 35, and 36; and Solvent Blacks 5 and 7.

The solvent used with the baths of this invention is generally water. In some case, specifically with inks, intense color is required because of the nature of various printing processes. Water based flexographic inks print with ink films only a few microns thick so that the ink needs a high loading of colorant. In such circumstances, it may be found that the combination of dye, surfactant and water is too viscous for optimum press performance of the ink. In such a case it is usually found that the addition of a small amount of an active, water-miscible solvent, for example 2-butoxy ethanol, will thin the ink to appropriate levels. Such solvents might include, but not be limited to the lower alcohols, glycol ethers, and glycols.

In summary, the baths used with this invention are generally only water, except in certain cases when it is desirable to adjust certain properties of the water bath, usually viscosity. To lower the viscosity of the bath it is generally desirable to add small amounts of a water miscible active solvent. In the case of the desire to thicken a bath, various water soluble polymers developed for that purpose may be used. In addition in some cases it may be desirable to use excess surfactant as a thickener.

Many treatments may be used to enhance the receptivity of cotton to dyeing from the dye baths contemplated in this invention. Perhaps the simplest and easiest is to use polymers that have been used to enhance the wash fastness of direct dyes on cotton. Such materials include polyamine polymers with active groups to covalently bond with cotton. Examples are Neofixs E-117 and R-250 from NICCA, U.S.A. of Fountain Inn, S.C.

Other treatments include the heating of cotton impregnated with 10% sodium hexametaphosphate solution for an hour at 120 degrees Celsius. Cotton so treated, after rinsing in dilute acid becomes receptive to dyeing with cationic dyes. Another method of enhancing receptivity is to merely dip the cotton in a one percent solution of polyethyleneimine and dry. This latter treatment gives rise to intense dyeings, which may not withstand crock or wash fastness tests.

Finally treatment with metals such as zinc, copper or aluminum enhance receptivity of the fabric to dyeing from baths in accord with the teachings of this invention. The metal may be applied as a water solution of a convenient salt of the metal. The salt is then precipitated by treatment with a weak base such a sodium carbonate, or perhaps ammonia, and the fabric dyed from the baths herein described. Both the receptivity of the fabric and the fastness of the dyeing are enhanced.

As mentioned above, certain simple azo disperse or solvent dyes may be used as dyes in protonated form for the dyeing of cationic dye receptive polyester and acrylic, and left in that form after dyeing. What is achieved are beautiful, bright colorations of the fibers using easily applied and inexpensive dyes. Formula 3 shows the general structure of such dyes. The color of the protonated form of such dyes is usually considerably more intense than, and is bathochromic to, the color of the non protonated form.

Protypical Cationicly Charged Cyanine Type Dye

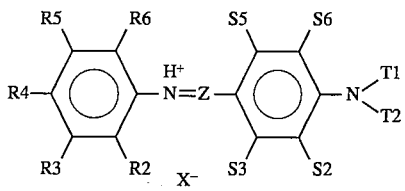

Formula 3

Solvent Yellow 56 is the case of the dye in Formula 1 when R2-R5, S2, S3, S5, and S6 are all hydrogen and T1 and T2 are ethyl groups. This dye is golden yellow when non protonated, but a bright clear magenta when protonated. Electron donating groups at R4, and electron withdrawing groups in the 2 position of T1 or T2 are bathochromic for this dye. Having the coupler be a naphthyl group is also bathochromic. Having either T1 or T2 be phenyl is bathochromic. Such dyes can range in color from orange (phenylazoaniline) to blue (p-phenetidine azo coupled to N-phenyl-α-naphthylamine).

The dyes illustrated in Formula 3, are called, for purposes of this invention, "simple cyanine type dyes", to denote the fact that the central conjugated chain of unsaturated carbon or nitrogen atoms in the molecule (which is the chromophore) are terminated at each end with a nitrogen, at least one of which is not tertiary. When the non tertiary nitrogen becomes protonated, the dye is cationic. These dyes may be synthesized by the azo coupling of simple amines such as aniline, or substituted aniline, to substituted aromatic amines with an open para position.

In Formula 3, R2, R3, R4, R5, and R6 are usually hydrogen or an electron donating moiety. S2, S3, S4, and S5 are usually either cyclic groups, halogen, or electron donating groups. T1 and T2 are hydrogen, aliphatics or substituted aliphatics, aromatics or substituted aromatics, or alkyl aryls, such as benzyl. Z is —N= or —CH=.

Alternatively, non quarternized heterocyclics such a 2-aminobenzothiazole may be used as coupling agents. Under proper bath conditions, these compounds yield beautiful blues of greater light fastness than substituted anilines.

Specific examples of simple cyanine type dyes are Solvent Yellow 1, 2, 3, 4, 5, 56, 58; and Solvent Orange 3 and 9. The dye formed by azo coupling aniline to diphenylamine yields a dark maroon when protonated. Aniline coupled to N-phenyl-α-naphthylamine is a purple. P-phenetidine coupled to this same amine gives an eggshell blue. It has been observed that substitution in the para position of the diazo salt is bathochromic, if the substituent is electron donating.

Ortho substitution with respect to the azo group usually leads to a weakening of the color, presumably because of steric effects. In the case of the coupler, electron rich substituants on the nitrogen are bathochromic. Naphthylamine derivatives are somewhat bathochromic compared to aniline derivatives. Coupling using 2-amino-benzothiazole yield materials bathochromic to anilines. Diphenylamine with this latter diazo base gives a steel blue, and triphenylamine yields a cyan.

The simplest azo dye, phenylazoaniline, yields an orange when protonated. To achieve yellows for simple cyanine type dyes, condensations can be made between aniline, or aniline substituted in the para position with electron donating groups, and benzaldehyde, substituted in the para position with a substituted amino group. For example, aniline may be condensed with p-diethylamino-benzaldehyde. The result is an intense, brilliant yellow.

Cationic dye dyeable fibers for purposes of this invention include, as discussed above, animal fibers, cellulosic fibers treated in various ways to increase cationic dye receptivity, nylon, triacetate, polyurethanes, vinyl, leather, and synthetics made cationic dyeable such as special acrylics, polyesters, and polyolefins.

In the case of wool, silk, leather, or other animal fibers, the dye bath is usually heated to between 60 and 100 degrees Celsius, and the goods entered into the agitated dye bath using equipment designed for the purpose. Alternatively the material to be dyed may be padded with the dye solution and subjected to steaming. Because of excellant leveling of the dye baths that may be formulated using the teachings of this invention, piece goods are easily handled.

In the case of cationic dye dyeings of wool, silk, leather or other animal fibers, the dyed fabric may be rinsed and dried and is ready for use. In the case of solvent or disperse dyes, dyed while in cationic form, the procedure of dyeing is similar to that of cationic dye application except that rinsing usually is either more prolonged or with a solution of a weak base, to restore the dye to its non protonated form.

In the case of nylon, triacetate, vinyl, or acetate, the procedures used for dyeing are essentially the same as with animal fibers, however, the dyeings generally need more time for both dyeing and neutralization. With these materials dye baths normally need to be near or at the boil because of the less porous nature of the fibers. Cellulosics made cationic dye receptive require similar procedures to those required for animal fibers. Generally dyeings on cellulosics using cationic dyes lack wash fastness.

In the case of dyeings on polyester, acrylics, or polyolefins made to be cationic dye receptive, the dye bath is generally maintained at the boil. Dyeings may be with either standard cationic dyes, simple cyanine type dyes or solvent or disperse dyes. In this case, rinsing of the dyed fiber with water or solutions made alkaline with alkaline metal salts will not deprotonate the dye.

If these latter materials are dyed with disperse or solvent dyes with the aim of using them in the non protonated form, the dye deprotonation can be achieved by soaking the material, after dyeing, in warm ammoniated water or solution of other low molecular weight amine for an extended period of time (four or more hours).

For the dyeing of hydrophobic fibers, baths are prepared according to the above methods for preparing cationic dyeings of disperse or solvent dyes. The bath is then partially neutralized using ammonia, sodium carbonate or other convenient base, and used at the boil or with steaming equipment to achieve disperse dyeings of these fibers.

The concepts of this invention may be illustrated more fully by reference to the following examples:

Example 1

Four liters of tap water were heated to 95 degrees centigrade. One gram of phenylazoaniline from Aldrich Chemical Company of Milwaukee, Wis., was mixed with twenty grams of methanol obtained from Gem City Chemical Corporation of Dayton, Ohio., along with ten grams of DBSA obtained from Pilot Chemical Corporation, Middletown Ohio, and one gram of industrial grade 98% sulfuric acid, also obtained from Gem City Chemical. This mix of dye and acids in the alcohol was stirred and added to the heated water. About one foot square samples each of white nylon, silk, and wool fabric obtained from Hancock Fabrics of Dayton, Ohio., were submerged in the bath at 95 degrees C. After about five minutes the intense bright orange samples of wool and silk were removed from the bath, rinsed with cold tap water, and submerged in a warm (40 degrees C.) bath of tap water and 0.5% of 30% ammonium hydroxide solution. Within seconds the samples of wool and silk turned an intense very bright golden yellow. After ten minutes in the dye bath, the nylon sample was rinsed in cold tap water and submerged in the warm ammonia solution. After about five minutes in the warm ammonia solution, the nylon sample had turned a beautiful, intense, very bright pure yellow. As would be expected (since phenylazoaniline is slightly soluble in water) all these samples if soaked for an extended period of time in water color the water a light yellow.

Example 2

One gram of Disperse Orange 1, obtained from Aldrich were stirred into a few grams of water. This mix was then added to a four liter bath of water at 95 degrees Celsius. DBSA from Pilot was slowly added until the bath changed in color from a brownish red to a bright purple and became transparent. About three grams of DBSA were consumed by this procedure. About one foot square each of nylon, silk, and wool from Hancock were entered into the bath. The dye bath yielded reddish purple samples prior to rinsing. After rinsing in ammoniated water, the samples became a rich, bright reddish-orange, fast to water.

Example 3

In Example 3 identical procedures were followed to the those of Example 2 except that 1.0 grams of Disperse Red 1 obtained from Aldrich was substituted for the Disperse Orange 1. In this case the dye bath is magenta in color and the dyeing after rinsing in ammonia water is a bright scarlet red which is fast to water.

Example 4

In Example 4 identical procedures were followed to those of Example 2 except that 1.0 grams of Disperse Red 13 obtained from Aldrich was substituted for the Disperse Orange 1. In this case the dye bath is red and the dyed material after rinsing in ammonia is a deep purplish red which is fast to water.

Example 5

In Example 5 identical procedures were followed as in Example 2 except that 1.0 grams of Disperse Red 167 obtained from Sandoz Chemical Corp., Charlotte, N.C., were used in place of the Disperse Orange 1. The dye bath is a pretty magenta and the dyeings after rinsing in the ammonia water are a bright rubine red which is fast to water. It was noted that the fabric took considerably longer to reach an acceptable level of color. This observation is explained as due to the greater size of a Disperse Red 167 molecule. This dye in particular is a higher energy dye than the ones considered in the above examples.

Example 6

In Example 6 identical procedures were followed to those of Example 2 except that 1.0 grams of Disperse Blue 79 obtained from Ciba-Geigy Corporation of Greensboro, N.C., was substituted for the Disperse Orange 1. In this case the dye bath is blue and the dyeing after rinsing is a rich Navy blue which is fast to water. After about an hour it was noticed that the bath no longer gave a blue dyeing, but instead, a green on a sample of wool. After twenty four hours the bath dyed a sample of wool a bright golden yellow. These results were taken as evidence that the bromine atom adjacent to the azo group in the dye had hydrolyzed to a hydroxyl group.

Example 7

In Example 7 identical procedures were followed to those in Example 2 except that 1.0 grams of Disperse Blue 3, an anthraquinone dye, were substituted for the Disperse Orange 1. The dye bath is blue and the dyeings after the rinse in ammoniated water were a bright, intense blue which is fast to water.

Example 8

In Example 8 identical procedures were followed to those of Example 2 except that 1.0 grams of Disperse Red 60 from Sandoz was substituted for the Disperse Orange 1. The dye bath is red and the dyeings after rinsing in the ammoniated water are a bright magenta red which is fast to water.

Example 9

In Example 9 identical procedures were followed to those of Example 1 except that 0.5 grams of Solvent Yellow 14 obtained from Dayton Tinker Company of Dayton, Ohio, were substituted for the phenylazoaniline. In this case the dye bath is yellowish orange and somewhat cloudy and the dyeings after the ammoniated water rinse are vibrant, intense, clear oranges.

Example 10

In Example 10 identical procedures were followed to those of Example 1 except that 0.5 grams of Solvent Yellow 16, an azo dye derived from the coupling of aniline to 3-methyl-1-phenyl-2-pyrazolin-5-one obtained from Dayton Tinker Company of Dayton, Ohio were substituted for the phenylazoaniline. The dye bath is a somewhat cloudy yellow and the dyeings, after rinsing with ammoniated water, are attractive, intense, bright pure yellows which are fast to water.

Example 11

In Example 11 identical procedures were followed to those of Example 1 except that 0.5 grams of Nigrosine SAP nigrosine base, available from Orient Chemical of Newark, N.J., were substituted for the phenylazoaniline. The dye bath was a deep blue and the dyeings after rinsing were a dark bluish black. In the case of nigrosine, the nylon seemed to dye rather slowly probably because the dye molecule is quite bulky. The silk and wool dyeings were both reasonably rapid and intense. The dyeings are fast to water.

Example 12

In Example 12 identical procedures were followed to those of Example 1 except that 0.5 grams of Solvent Blue 23, available from BASF Corporation, of Holland, Mich. as their Neptun Blue Base NB 652 was substituted for the phenylazoaniline. The dye bath in this case is blue and the dyeings are deep neutral blues. Surprisingly, the dyeing on wool is shaded to the red more than the dyeings on silk or nylon. Probably because of the relatively large size of a Solvent Blue 23 molecule, the dyeing of nylon in this case is somewhat slow, taking about one half hour to reach a fairly deep shade. The dyeings are fast to water.

Example 13

In Example 13 identical procedures were followed to those of Example 1 except that 0.5 grams of Solvent Yellow 33, a quinoline dye, available from Atlantic Chemical Corp., Nutley, N.J., was used instead of phenylazoaniline. The light yellow, slightly cloudy dye bath yields a bright yellow dyeing after rinsing. The dyeings were fast to water.

Example 14

In Example 14 identical procedures were followed to Example 1 except that 0.5 grams of a metal complexed red pigment known as Pigment Red 48:2 from Miles Corporation of Pittsburgh, Pa., was substituted for the phenylazoaniline. The slightly cloudy red dye bath yielded very bright red dyeings after rinsing with ammoniated water. The dyeings are fast to water.

Example 15

In example 15 identical procedures were followed to those of Example 1 except that Alizarin, a dihydroxy anthraquinone, from Aldrich was substituted for the phenylazoaniline. The weakly colored yellow dye bath yielded bright golden yellow dyeings that turned a reddish orange when boiled in lime water.

Example 16

In Example 16 identical procedures were followed to those of Example 1 except that 1.0 grams of Disperse Yellow 3 from Atlantic Chemical were substituted for the phenylazoaniline. Very bright golden yellow dyeings were achieved.

Example 17

In Example 17 identical procedures were followed to those of example 1 except that 0.5 grams of Solvent Red 23 available from Aldrich as Sudan III dye was substituted for the phenylazoaniline. The dye bath is a cloudy red and it was found that the rate of dyeing was so slow that reasonable intensities of color could not be obtained until after about twenty minutes. The dyeings were red but not particularly bright and the handle of the silk and wool had become rough.

Example 18

Two grams of Basic Red 12, obtained from Atlantic Chemical Corp. as their Paper Red P was added to four liters of 95 degree Celsius water. About four grams of DBSA was slowly poured into the bath. At first the bath became cloudy, but cleared after about 3.2 grams of DBSA had been entered into the bath. Samples, each about 6 inches square of white wool, silk, nylon, cotton, polyester, triacetate, and rayon were entered into the bath for about five minutes. All samples were then rinsed in cold water for about ten minutes. All samples were dyed, however, the polyester is relatively light in color and dull looking, especially after drying. The wool, silk, nylon, rayon, and triacetate were all dyed intense brilliant shades of bright red. The cotton was dyed intensely, but tended to dull down on drying. If left in water for an extended time, the cotton tends to color the water pink. The rayon is a less intense shade after drying and also tends to bleed into water. The nylon, triacetate, and polyester were wash fast under conditions of ordinary home laundering. The silk and wool do not bleed when washed in Woolite, but will offset onto paper slightly when placed wet on the paper and allowed to dry. Samples of the dyed wool, silk and nylon were placed under a sunlamp. After 24 hours some fading was noted. This result is satisfactory for most apparel applications.

Example 19

Two grams of Yellow BL liquid basic yellow dye obtained from Miles of Pittsburgh, Pa. were used in an identical manner to the Red dye of Example 18. The resulting brilliant dyeings followed the patterns observed with the red except that the colors had much better lightfastness.

Example 20

Two grams of Basic Blue 3 obtained from Aakash Co. of Chicago, Ill. were used in an identical manner to the red dye of Example 18. The resulting attractive bluish green dyeings followed the patterns observed with the red. If anything, the lightfastness was somewhat less good than with the Red.

Example 21

Forty Grams of Paper Red P dye from Atlantic was added to 3.7 liters of water. While stirring two hundred grams of 30% active ammonium lauryl sulfate solution from Continental Chemical of Clifton, N.J., was added. The solution first turned cloudy, then cleared, as the surfactant was added. Approximately 60 grams of 35% ammonium hydroxide solution was then slowly added to the mix while monitoring pH until a pH of 8.4 was reached. This material is useful as an ink jet printing ink giving water-fast, bright-red prints on the paper. It is stable and filterable to 0.3 microns.

Example 22

A sample of ordinary white muslin cotton cloth from Hancock fabrics of Dayton, Ohio, was dipped into a four percent solution of Neofix R-250 from Nicca U.S.A., Inc. of Fountain Inn, S.C. The material was padded and dried in an oven at 150 degrees F. for 30 minutes.

Example 23

A sample of ordinary white muslin cotton cloth from Hancock fabrics of Dayton, Ohio, was dipped into a four percent solution of Neofix E-117 from Nicca U.S.A., Inc. of Fountain Inn, S.C. The material was padded and dried in an oven at 150 degrees F. for 30 minutes.

Example 24

A dye bath was prepared according to the recipe of example 18. Samples of the treated cotton of examples 22 and 23 were dyed using this material. The resulting dyeings were intense and attractive. There is bleed from dyed materials left for extended times in plain water.

Example 25

A dye bath was prepared in accord with the recipe of example 2. Samples of fabric prepared in Examples 22 and 23 were dyed using this bath. The resulting intense orange dyeings are fast to water and bleed, but faded heavily when washed repeatedly in a home washing machine using hot water and a harsh detergent such as Tide, from Procter and Gamble Co. of Cincinnati, Ohio. Using a cold water cycle and the same detergent fading from washing was not detectable after four washings.

Example 26

A dye bath was prepared by first dissolving 1 gram of Solvent Yellow 56, purchased from BASF Corp. of Holland, Mich., as their Sudan 150, in 30 grams of methanol and 3.5 grams of DBSA from Pilot, then diluting with 500 grams of water. The bath was heated to boiling and a 15 cm.×15 cm. sample of white acrylic fake fur from Hancock Fabrics was placed in the bath and stirred for ten minutes. The sample was then rinsed in cold water. The material is a brilliant clear magenta that is stable to washing.

What is claimed is:

1. A dye bath for textile fibers selected from the group consisting of nylon, silk, wool, human hair, fur, alpaca or other animal fibers; fibers of polyester, polyamide, or polyolefins that have been polymerized with some portion of monomers that contain sulfonic acid groups to render them receptive to cationic dyes; triacetate and acetate fibers; vinyl fibers, and cellulose fibers treated so as to make them receptive to cationic dyes comprising between $10^{-4}$ and 15 percent of one or more (cationic) dyes selected from the list of basic, disperse and solvent dyes in *The Color Index, Third Edition* and its supplements, a sufficiency of an anionic surfactant for solubilizing and protonating said dye or dyes, and water maintained at a pH such that said dye is in protonated form.

2. A dye bath according to claim 1 wherein said dye is selected from the group consisting of Disperse Yellow 3, 5, 7, 23, 42, 54, 64, 82, 163, or 211; Disperse Orange 1, 3, 25, 29, 30, 37, or 44; Disperse Red 1, 4, 5, 11, 13, 15, 17, 50, 54, 60, 65, 73, 82, 86, 91, 92, 135, 167, 176:1, 177or 179; Disperse Violet 1, 26, 28or 33; Disperse Blue 3, 7, 35, 56, 60, 73, 79, 87, 102, 106, or 291; Disperse Black 9; Solvent Yellow 2, 3, 13, 14, 33, or 56; Solvent Orange 2, 7, 20, or 60; Solvent Red 1, 52, or 111; Solvent Violet 14; Solvent Blue 23, 35or 36; and Solvent Blacks 5 or 7; Basic Yellow 2, 11, 13, 21, 28, 29, 37, 40or 51; Basic Orange 1, 2, 3, 4, 10, 14or 16; Basic Blue 1, 3, 7, 9, 26, 41, or 54 or mixtures thereof.

3. A dye bath according to claim 1 wherein said surfactant is a salt of a long chain fatty acid, an alkylbrnezne sulfonate, an alpha olefin sulfonate, an ethoxylated alcohol sulfonate, a lignin sulfonate, a condensation polymer of naphthalene sulfonic acid and formaldehyde, an alkyl naphthalene sulfonate, a dialkyl sulfosuccinate, a glycerol sulfate of a long chain fatty acid or mixtures thereof.

4. A method of dyeing textile fibers selected from the group consisting of nylon, silk, wool, human hair, fur, alpaca or other animal fibers; fibers of polyester, polyamide, or polyolefins that have been polymerized with some portion of monomers that contain sulfonic acid groups to render them receptive to cationic dyes; triacetate and acetate fibers; vinyl fibers, and cellulose fibers treated so as to make them receptive to cationic dyes comprising dyeing in a dyebath comprising between $10^{4}$ and 15 percent of a dye, selected from the list of basic, disperse, or solvent dyes in The Color Index, an Third Edition, and its supplements, a sufficiency of an anionic surfactant for solubilizing and protonating said dye or dyes, and water maintained at a pH such that said dye is in protonated form.

5. A method according to claim 4 wherein said dye is selected form the group consisting of Disperse Yellow 3, 5, 7, 23, 42, 54, 64, 82, 163, or 211; Disperse Orange 1, 3, 25, 29, 30, 37, or 44; Disperse Red 1, 4, 5, 11, 13, 15, 17, 50, 54, 60, 65, 73, 82, 86, 91, 92, 135, 167, 176:1, 177or 179; Disperse Violet 1, 26, 28, or 33; Disperse Blue 3, 7, 35, 56, 60, 73, 79, 87, 102, 106, or 291; Disperse Black 9; Solvent Yellow 2, 3, 13, 14, 33, or 56; Solvent Orange 2, 7, 20, or 60; Solvent Red 1, 52, or 111; Solvent Violet 14; Solvent Blue 23, 35, or 36; and Solvent Blacks 5 or 7; Basic Yellow 2, 11 13, 21, 28, 29, 37, 40, or 51; Basic Orange 1, 2 or 21; Basic Red 1, 12, 14, 15, 16, 18, 46, or 49; Basic Violet 1, 2, 3, 4, 10, 14, or 16; Basic Blue 1, 3, 7, 9, 26, 41, or 54 or mixtures thereof.

6. A method according to claim 4 wherein said surfactant is a salt of a long chain fatty acid, an alkylbenzene sulfonate, an alpha olefin sulfonate, an ethoxylated alcohol sulfonate, a lignin sulfonate, a condensation polymer of naphthalene sulfonic acid and formaldehyde, an alkyl naphthalene sulfonate, a dialkyl sulfosuccinate, a glycerol sulfate of a long chain fatty acid or mixtures thereof.

7. Textile fibers selected from the group consisting of nylon, silk, wool, human hair, fur, alpaca or other animal fibers; fibers of polyester, polyamide, or polyolefins that have been polymerized with some portion of monomers that contain sulfonic acid groups to render them receptive to cationic dyes; triacetate and acetate fibers; vinyl fibers, and cellulose fibers treated so as to make them receptive to cationic dyes dyed using a dye bath comprising between $10^{-4}$ and 15 percent of a dye, selected from the list of basic, disperse, or solvent dyes in The Color Index, Third Edition, and its supplements, a sufficiency of an anionic surfactant for solubilizing and protonating said dye or dyes, and water maintained at a pH such that said dye is in protonated form.

8. Textile fibers, according to claim 7 wherein said dye is selected from the group consisting of Disperse Yellow 3, 5, 7, 23, 42, 54, 64, 82, 163, or 211; Disperse Orange 1, 3, 25, 29, 30, 37, or 44; Disperse Red 1, 4, 5, 11, 13, 15, 17, 50, 54, 60, 65, 73, 82, 86, 91, 92, 135, 153, 167, 176:1, 177, or 179; Disperse Violet 1, 26, 28, or 33; Disperse Blue 3, 7, 35, 56, 60, 73, 79, 87, 102, 106, or 291; Disperse Black 9; Solvent Yellow 2, 3, 13, 14, 33, or 56; Solvent Orange 2, 7, 20, or 60; Solvent Red 1, 52, or 111; Solvent Violet 14; Solvent Blue 23, 35, or 36; and Solvent Blacks 5 or 7; Basic Yellow 2, 11 13, 21, 28, 29, 37, 40, or 51; Basic Orange 1, 2 or 21; Basic Red 1, 12, 14, 15, 16, 18, 46, or 49; Basic Violet 1, 2, 3, 4, 10, 14, or 16; Basic Blue 1, 3, 7, 9, 26, 41, or 54 or mixtures thereof.

9. Textile fibers according to claim 7 wherein said surfactant is a salt of a long chain fatty acid, an alkylbenzene sulfonate, an alpha olefin sulfonate, an ethoxylated alcohol sulfonate, a lignin sulfonate, a condensation polymer of naphthalene sulfonic acid and formaldehyde, an alkyl naphthalene sulfonate, a dialkyl sulfosuccinate, a glycerol sulfate of a long chain fatty acid or mixtures thereof.

10. An ink for dyeing paper products comprising between $10^{-4}$ and 15 percent of a dye, selected from the list of basic, disperse, or solvent dyes in The Color Index, Third Edition, and its supplements, a sufficiency of an anionic surfactant for solubilizing and protonating said dye or dyes, and water maintained at a pH such that said dye is in protonated form.

11. An ink according to claim 10 wherein said dye is selected from the group consisting of Disperse Yellow 3, 5, 7, 23, 42, 54, 64, 82, 163, or 211; Disperse Orange 1, 3, 25, 29, 30, 37, or 44; Disperse Red 1, 4, 5, 11, 13, 15, 17, 50, 54, 60, 65, 73, 82, 86, 91, 92, 135, 153, 167, 176:1, 177, or 179; Disperse Violet 1, 26, 28, or 33; Disperse Blue 3, 7, 35, 56, 60, 73, 79, 87, 102, 106, or 291; Disperse Black 9; Solvent Yellow 2, 3, 13, 14, 33, or 56; Solvent Orange 2, 7, 20, or 60; Solvent Red 1, 52, or 111; Solvent Violet 14; Solvent Blue 23, 35, or 36; and Solvent Blacks 5 or 7; Basic Yellow 2, 11 13, 21, 28, 29, 37, 40, or 51; Basic Orange 1, 2 or 21; Basic Red 1, 12, 14, 15, 16, 18, 46, or 49; Basic Violet 1, 2, 3, 4, 10, 14, or 16; Basic Blue 1, 3, 7, 9, 26, 41 or 54 or mixtures thereof.

12. An ink, according to claim 10, wherein said surfactant is a salt of a long chain fatty acid, an alkylbenzene sulfonate, an alpha olefin sulfonate, an ethoxylated alcohol sulfonate, a lignin sulfonate, a condensation polymer of naphthalene sulfonic acid and formaldehyde, an alkyl naphthalene sulfonate, a dialkyl sulfosuccinate, a glycerol sulfate of a long chain fatty acid or mixtures thereof.

* * * * *